Patented Apr. 26, 1938

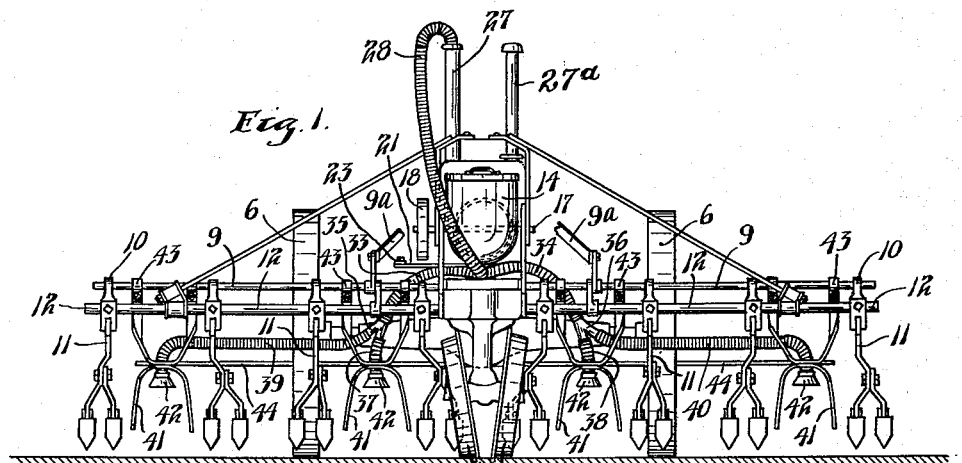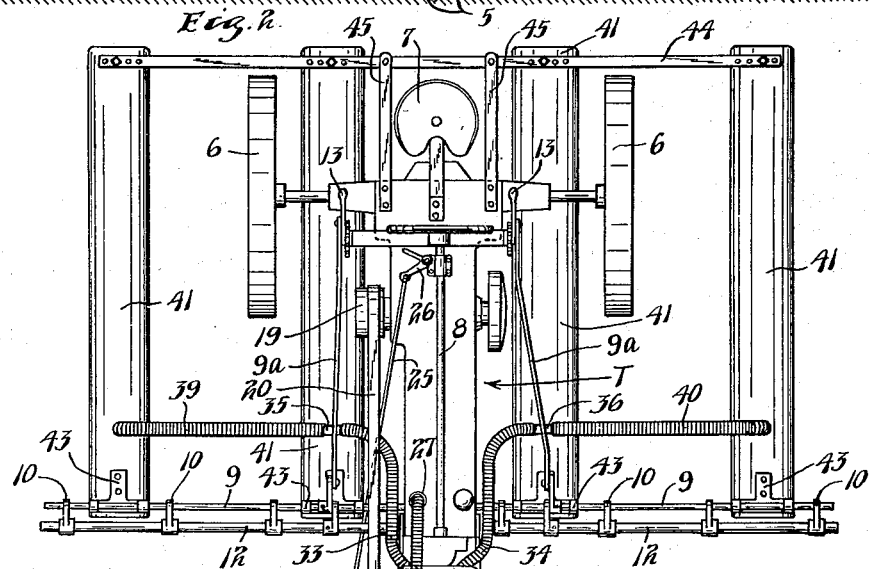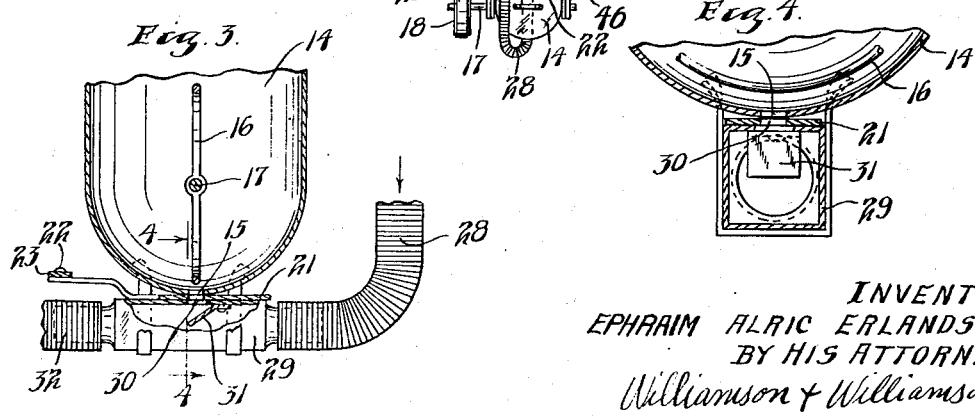

2,115,199

UNITED STATES PATENT OFFICE 2,115,199

PLANT DUSTER

Ephraim Alric Erlandson, Kennedy, Minn.

Application June 14, 1937, Serial No. 148,059

2 Claims. (Cl. 43—148)

This invention relates to an apparatus for dusting plants and in particular to an apparatus which may be mounted upon a tractor or other vehicle to dust plants growing in the fields in rows.

Attempts have been made heretofore to devise suitable dusting devices for discharging powdered insecticides, as for instance in connection with the extermination of potato bugs, but any of these devices have numerous drawbacks. There have been devices produced heretofore which include the use of a cover or hood which may extend over several rows of plants in the field in an attempt to confine the dust or powder to a limited space, in order that it will not be blown by the wind and much of the powder lost. There have, also been some attempts made to provide means for confining the dust to areas adjacent a single row of growing plants in order that most of the insecticide may be efficiently utilized. It has been found, however, in case a cover extends over several rows that much of the dust is deposited on the ground between the rows and only a very small percentage actually is deposited upon the plants themselves. Other devices which have been designed have been found to be incapable of retaining the light dust adjacent the plants sufficiently to provide an effective dusting thereof. In addition, many of the structures previously known to the art are cumbersome and expensive, and have, therefore, not been used to any great extent.

It is the general object of my invention to provide a plant dusting attachment for tractors and the like, which may be inexpensively constructed and which will very efficiently confine the powdered insecticide to the immediate locality of the row of plants so that a relatively high percentage of the dust is put to good use and there is very little waste. Furthermore the dust is so controlled that it will not create objectionable clouds of the insecticide material adjacent the operator of the apparatus with possible injurious effects.

A further object of my invention is to provide a plant dusting attachment which may be operated in conjunction with a cultivator attachment upon a tractor or other vehicle.

These and other objects and advantages of the invention will more fully appear from the following description made in connection with the accompanying drawing wherein like reference characters refer to the same or similar parts throughout the views, and, in which, Fig. 1 is a front elevation of a farm tractor with a cultivator attachment and my dusting apparatus mounted thereon;

Fig. 2 is a plan view thereof;

Fig. 3 is an enlarged fragmentary detail of the lower part of the dispensing hopper; and Fig. 4 is a vertical section taken on the line 4—4 of Fig. 3.

In the particular embodiment of my invention shown in the drawing there is provided a tractor indicated as an entirety by the letter T, this tractor being shown as one of those generally in use today and which is provided with an internal combustion engine to provide motive power. The tractor is provided with small front wheels 5 and relatively large rear wheels 6. A seat 7 is mounted at the rear of the tractor and a steering gear 8 is shown generally and it is intended to be connected to the front wheels in any well known manner.

Extending laterally from the front portion of the tractor is a cultivator frame including swingably mounted bars 9 to which are pivotally secured the upper ends 10 of a plurality of cultivator elements 11. These elements are also secured adjacent the upper ends to laterally extending bars 12, which are journaled near and parallel to the bars 9. A pair of levers 9a are secured between the bars 9 and a pair of handles 13 adjacent the seat of the tractor. Manipulation of these handles causes pivotal movement of the cultivator elements, along with the bars 12, to cause raising and lowering of said cultivator elements. The cultivator, itself, is of conventional design and need not be gone into in any great detail.

Suitably mounted on a frame indicated generally at 46 in front of the forward portion of the tractor is a powder dispensing hopper 14 which has an opening 15 in its bottom and which preferably includes an agitating element 16 mounted upon a cross shaft 17. The cross shaft 17 extends outwardly from one side of the hopper and is provided with a pulley 18 mounted substantially in alignment with a power driven pulley 19, which is a customary feature of a conventional tractor design. A belt 20 provides a power connection between the pulley 19 and the pulley 18. The opening 15 in the bottom of the hopper has mounted therebelow a sliding gate 21, which is provided with an opening adapted to be registered with the hopper opening 15, and which is connected at 22 with a lever 23, the latter being pivotally secured at its end 24 to any convenient portion of the hopper supporting frame 46. The opposite end of the lever 23 is connected to a rod 25, and a handle element 26 within convenient reach of the operator of the tractor.

The usual exhaust pipe 27, which is part of the power plant of the tractor and opposite to the breather pipe 27a of the tractor engine, has secured thereto a flexible tubing 28, which extends downwardly to the bottom of the hopper 14 where it connects with a casing 29, which is provided with an opening 30 in alignment with the discharge opening 15 at the bottom of the hopper. A baffle 31 is positioned within the casing 29 below the opening 30 to prevent exhaust gases flowing through the conduit 28 from below up into the hopper and also to produce a suction effect upon the powder issuing from the hopper. The opposite end of the casing 29 is connected to a conduit 32 which is divided to form powder conducting tubes 33 and 34, which extend to either side of the tractor. The tubes 33 and 34, are themselves, provided with Y-shaped branches 35 and 36. From these Y-connections extend the short tubes 37 and 38 and the longer tubes 39 and 40, the latter extending outwardly a considerable distance from the tractor. These tubes 37, 38, 39 and 40 extend through the forward ends of a series of relatively long narrow hood elements 41, which are in parallel spaced relationship to each other and extend from points adjacent the front of the tractor to points preferably just behind the seat at the rear of the tractor. Where the tubes extend through said hoods, they are provided with discharge nozzles, 42, which are preferably mounted in the upper front portions of said hoods.

The forward ends of the hoods are secured by brackets 43 to the oscillating shaft 9 so that when the cultivator elements are elevated as described above, the forward ends of the hoods 41 will also be elevated. The brackets 43 are hooked over the tops of the rods 9 and clamped by bolts and nuts as shown. This arrangement permits ready removal of the hoods when desired, and also permits their adjustment for rows of different widths. The rear ends of the hoods are connected to each other by a strap 44 and a pair of supporting arms 45 extend from the rear end of the tractor to connect with the cross arm 44. The cross arm 44 is provided with groups of spaced openings to permit lateral adjustment of the rear ends of the hoods in conformity with movement of the front ends of the hoods. If desired the straps 45 may be slightly resilient to accommodate for the slight movement of the rear ends of the hoods when the forward ends are elevated.

From the foregoing description, it will be seen that I have provided an extremely simple and efficient means for dusting row plants with an insect powder. In Fig. 1 the cultivator elements and hoods are shown in their elevated position. However, when the cultivator frame is lowered, the sides of the hoods will be positioned immediately next to the ground so that when powder is blown through the distributing conduit under influence of the exhaust gases from the tractor motor, the powder will issue from the nozzles 42, and be retained within the hoods in close proximity to the plants to be dusted. I place particular importance upon the relative length of the hoods. These long narrow hoods serve a duplicate purpose. One is that they should be sufficiently long to permit settling of the dust before the rear ends of the hoods uncover the plants which have been dusted. The other purpose for providing the elongated hoods which extend preferably to points at least as far back as the seat of the tractor is to prevent the powder from blowing up in a cloud in the face of the operator of the tractor. Many of the powders used for destroying insect pests on plants are extremely disagreeable to humans, even actually injurious to them. It should be further noted that by confining the lateral distribution of dust none of it is permitted to settle between the plant rows where it would be wasted. In the particular embodiment shown in the drawing the hoods are spaced to approximately the distance between rows of potato plants. This spacing is, of course, only relative to the size of the tractor shown in the drawing and is not intended to show that any particular spacing should be indicated.

It is not intended that my dusting attachment be used only with a tractor having a cultivator mounted thereon, but it has been found advantageous to carry out the dusting operation simultaneously with the cultivation of the plants, so that the field need be covered only once to accomplish the two results.

It will, of course, be understood that various changes may be made in the form, details, arrangement, and proportions of the various parts without departing from the scope of my invention.

What is claimed is:—

1. A plant row dusting attachment for tractors driven by internal combustion engines which have exhaust gas outlets comprising a hopper having a dispensing opening, a hood extending longitudinally of the tractor throughout substantially its entire length, said hood being relatively narrow with respect to its length, and a conduit extending from said exhaust outlet to said hood, said conduit communicating with the dispensing opening in said hopper to receive powder therefrom and convey it to said hood.

2. In combination with a plant row cultivator attachment for tractors and the like, a plant row duster including a hood element supported by the cultivator frame and extending throughout substantially the entire length of said tractor and being only of sufficient width to closely confine the sides of said plant row, said cultivator attachment including means for raising and lowering the cultivator elements, and said hood element being supported by said cultivator to be raised and lowered with said cultivator elements, and means for introducing a dusting powder into said hood.

E. ALRIC ERLANDSON.